United States Patent [19]
Miyashita

[11] Patent Number: 6,014,086
[45] Date of Patent: Jan. 11, 2000

[54] WIRELESS SELECTIVE CALL RECEIVER WITH ALARM MESSAGE SIGNAL STORED TO HAVE PROTECTION ATTRIBUTE

[75] Inventor: Yukio Miyashita, Shizuoka, Japan

[73] Assignee: NEC Corporation, Tokyo, Japan

[21] Appl. No.: 08/897,427

[22] Filed: Jul. 21, 1997

[30] Foreign Application Priority Data

Aug. 14, 1996 [JP] Japan .................................. 8-214819

[51] Int. Cl.⁷ ...................................................... H04Q 7/18
[52] U.S. Cl. ................................ 340/825.44; 455/38.4; 455/517; 455/575; 370/313; 707/205
[58] Field of Search .................... 340/825.44, 825.69, 340/825.45; 455/458, 426, 38.4, 140, 526, 517, 575, 31.1, 38.1, 38.2; 370/310, 312, 313; 707/100, 205

[56] References Cited

U.S. PATENT DOCUMENTS

| | | | |
|---|---|---|---|
| 4,851,829 | 7/1989 | Deluca et al. | 340/825.44 |
| 4,872,005 | 10/1989 | Deluca et al. | 340/825.44 |
| 5,075,684 | 12/1991 | Deluca | 340/825.44 |
| 5,225,826 | 7/1993 | Deluca et al. | 340/825.44 |
| 5,258,739 | 11/1993 | Deluca et al. | 340/825.44 |
| 5,349,696 | 9/1994 | Matai | 340/825.44 X |
| 5,418,529 | 5/1995 | De Luigi et al. | 340/825.44 |
| 5,430,440 | 7/1995 | Shim | 340/825.44 |
| 5,488,359 | 1/1996 | Faris et al. | 340/825.44 |

FOREIGN PATENT DOCUMENTS

| | | |
|---|---|---|
| 64-54437 | 4/1989 | Japan . |
| 1-135235 | 5/1989 | Japan . |
| 5-48517 | 2/1993 | Japan . |
| 7-7759 | 1/1995 | Japan . |
| 7-59140 | 3/1995 | Japan . |

*Primary Examiner*—Michael Horabik
*Assistant Examiner*—William H. Wilson, Jr.
*Attorney, Agent, or Firm*—Sughrue, Mion, Zinn, Macpeak & Seas, PLLC

[57] ABSTRACT

In a wireless selective call receiver, a receiving section receives a wireless selective call signal including a selective call signal and subsequent a message signal and destined to the wireless selective call receiver, and then, decodes the received wireless selective call signal to produce the message signal. A storage section includes an alarm message storage region for storing alarm message signals and a normal message storage region for storing normal message signals. An informing section informing an alarm at an alarm time set in each of the alarm message signals which are stored in the alarm message storage region. A detecting section detects that the received message signal is a new alarm message signal or a new normal message signal. A write section writes the new normal message signal in the normal message storage region when the received message signal is the normal message signal. On the other hand, the write section selectively writes the new alarm message signal in one of the alarm message storage region and the normal message storage region based on a number of the alarm message signals stored in the alarm message storage region and a protection attribute of each of the alarm message signals from a delete operation.

19 Claims, 6 Drawing Sheets

|  | ALARM MESSAGE STORAGE REGION 107A | | NORMAL MESSAGE STORAGE REGION 107B | | |
|---|---|---|---|---|---|
| MESSAGE STORAGE REGION | MESAGE 1 | MESAGE 2 | | | |
| | MESAGE 3 | MESAGE 4 | | | |
| | MESAGE 5 | MESAGE 6 | | | |
| | MESAGE 7 | MESAGE 8 | | | |
| | MESAGE 9 | MESAGE 10 | | | |
| ATTRIBUTE REGION | ① | ② | ③ | ④ | ⑤ | ⑥ |
| | ⑦ | ⑧ | ⑨ | ⑩ | | |

Fig. 4

ESC 106A    SET 106B    SEL 106C

Oct. 5 (Wed) PM2:30
MEETING (5$^{TH}$ ROOM)

Fig. 7

Oct. 5 (Wed) PM2:30
PLEASE CALL BACK 045-939-1111

Fig. 8

WIRELESS SELECTIVE CALL RECEIVER WITH ALARM MESSAGE SIGNAL STORED TO HAVE PROTECTION ATTRIBUTE

BACKGROUND OF THE INVENTION

1. Field of the Invention

The present invention relates to a wireless selective call receiver which has an alarm function to inform a user of alarm by informing means such as a speaker and so on at an alarm time arbitrarily set by an alarm message signal, and more particularly to a wireless selective call receiver which has protection attribute of an alarm message signal.

2. Description of the Related Art

Conventional wireless selective call receivers are known in which an alarm time can be set by a switch operation by a user or is set in response to reception of an alarm message signal. Also, the technique is disclosed in Japanese Laid Open Patent Disclosure (JP-A-Heisei 1-135235) in which an external unit is connected to the receiver and an alarm content such as an alarm time and so on are set or changed by use of the external unit.

In the conventional wireless selective call receiver in which an alarm function is set by the alarm message signal, when the storage capacity of an alarm message storage section is full with alarm message signals, an alarm message signal which is newly received is stored in the alarm message storage section in place of an already informed alarm message signal. Accordingly, in this conventional wireless selective call receiver, there is a problem in that even if the deleted alarm message signal is important, the alarm message signal cannot be left.

Also, in the conventional wireless selective call receiver which is disclosed in the above reference, there is a problem in that the alarm content can be changed from the external unit, but the important alarm message signal can not be protected.

SUMMARY OF THE INVENTION

The present invention is made in the light of the above-mentioned circumstances. An object of the present invention is to provide a method for protecting an important alarm message signal and a wireless selective call receiver for the same.

In order to achieve an aspect of the present invention, a wireless selective call receiver includes a receiving section for receiving a wireless selective call signal including a selective call signal and subsequent a message signal and destined to the wireless selective call receiver and for decoding the received wireless selective call signal, a storage section having an alarm message storage region for storing alarm message signals and a normal message storage region for storing normal message signals, an informing section for informing an alarm at an alarm time set in each of the alarm message signals which are stored in the alarm message storage region, a detecting section for detecting whether the received message signal is a new alarm message signal or a new normal message signal, and a write section for writing the new normal message signal in the normal message storage region when the received message signal is the normal message signal, and for selectively storing the new alarm message signal in one of the alarm message storage region and the normal message storage region based on a number of the alarm message signals stored in the alarm message storage region and a protection attribute of each of the alarm message signals from a delete operation.

In this case, the storage section includes an attribute region for storing the protection attribute for each of the alarm message signals, and the write section refers to the attribute region to write the new normal message signal in the storage section.

The wireless selective call receiver desirably further includes an allocating section for allocating the protection attribute to the alarm message signals in the alarm message storage region including the new alarm message signal. In this case, the allocating section includes a mode setting section for setting an attribute change mode, a selecting section for selecting one of the alarm message signals in the alarm message storage region including the new alarm message signal, and a setting section for setting the protection attribute for the selected alarm message signal.

Also, the wireless selective call receiver desirably further includes a canceling section for canceling the protection attribute from the alarm message signals in the alarm message storage region including the new alarm message signal. In this case, the canceling section includes a mode setting section for setting an attribute change mode, a selecting section for selecting one of the alarm message signals in the alarm message storage region including the new alarm message signal, and a resetting section for resetting the protection attribute for the selected alarm message signal.

The write section may include a section for writing the new alarm message in the alarm message storage region when there is a free area in the alarm message storage region, for writing the new alarm message in the alarm message storage region in place of a specific one of the alarm message signals when the alarm message storage region is full and when the specific alarm message signal has been already informed and is not allocated with the protection attribute, and for writing the new alarm message in the normal message storage region when the alarm message storage region is full and when all the alarm message signals are allocated with the protection attribute.

In order to achieve another aspect of the present invention, a method of storing a new alarm message signal in a wireless selective call receiver, includes the steps of:

receiving a wireless selective call signal including a selective call signal and subsequent a message signal and destined to the wireless selective call receiver and decoding the received wireless selective call signal;

detecting whether the received message signal is a new alarm message signal or a new normal message signal; and performing a first writing operation of the new alarm message in the alarm message storage region when there is a free area in an alarm message storage region; and performing a second writing operation of the new alarm message in the alarm message storage region in place of a specific one of the alarm message signals when the alarm message storage region is full and when the specific alarm message signal has been already informed and is not allocated with the protection attribute.

In order to still another aspect of the present invention, a wireless selective call receiver, includes a receiving section for receiving a wireless selective call signal including a selective call signal and subsequent a message signal and destined to the wireless selective call receiver and decoding the received wireless selective call signal, a detecting section for detecting whether the received message signal is a new alarm message signal or a new normal message signal, and a write section for performing a first writing operation of the new alarm message in the alarm message storage region when there is a free area in an alarm message storage region, and performing a second writing operation of the new alarm message in the alarm message storage region in place of a specific one of the alarm message signals when the alarm message storage region is full and when the specific alarm message signal has been already informed and is not allocated with the protection attribute.

DESCRIPTION OF THE PREFERRED EMBODIMENTS

Next, a wireless selective call receiver of the present invention will be described below in detail with reference to the accompanying drawings.

Figure 1:
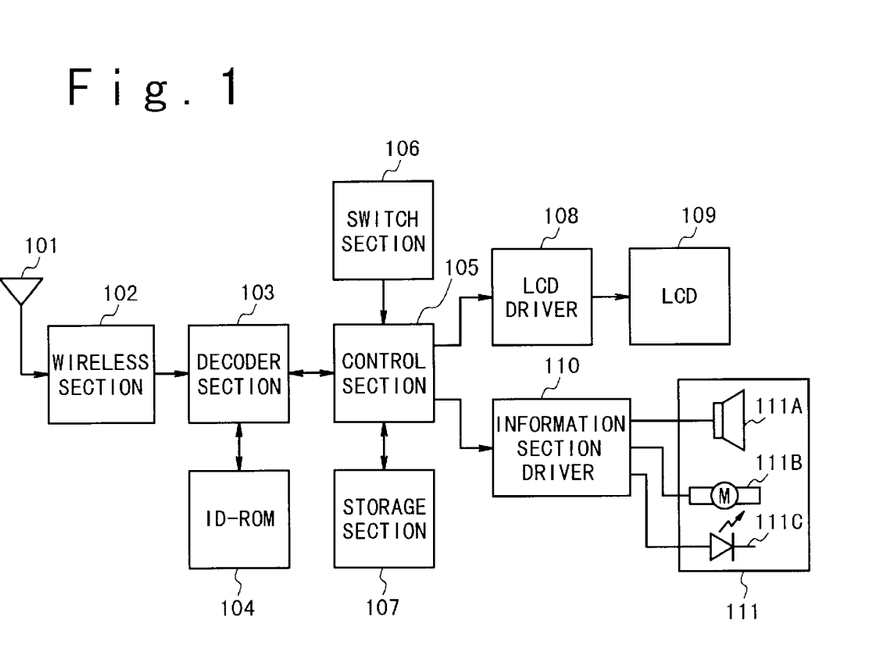
FIG. 1 is a block diagram illustrating the structure of a wireless selective call receiver according to an embodiment of the present invention.

FIG. 1 is a block diagram illustrating the structure of the wireless selective call receiver according to an embodiment of the present invention. The wireless selective call receiver shown in FIG. 1 is composed of an antenna 101, a wireless section 102, a decoder section 103, ID-ROM 104, a control section 105, a switch section 106, a storage section 107, a liquid crystal display driver 108, a liquid crystal display 109, an informing driver 110, and an informing section 111 composed of a speaker 111A, a vibrator 111B, an LED 111C.

A wireless selective call signal from a base station to which the wireless selective call receiver belongs is received by the antenna 101. The received wireless selective call signal is demodulated by the wireless section 102, and is shaped in the waveform, and then converted into a digital signal. The digital signal is supplied to the decoder section 103. The decoder section 103 decodes the digital signal and compares a selective call signal contained in the digital signal and a selective call number of the receiver which is written in the ID-ROM 104. When both are coincident to each other, the decoder section 103 sends a detection signal of the above selective call signal and a message signal contained in the digital signal and following the selective call signal to the control section 105. When receiving the detection signal, the control section 105 stores the message signal in the storage section 107. After that, the control section 105 controls the informing driver 110 to drive at least one of the speaker 111A, the vibrator 111B and the LED 111C of the informing section 111, in order to inform the user of the reception of a call by ringing, vibration or light.

Figure 2A:
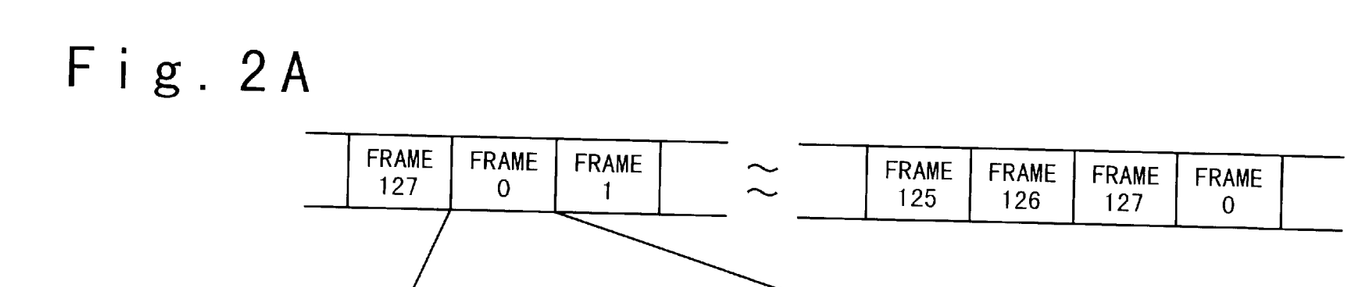
FIGS. 2A and 2B are diagrams illustrating the formats used in the wireless selective call receiver of the present invention.
Figure 2B:
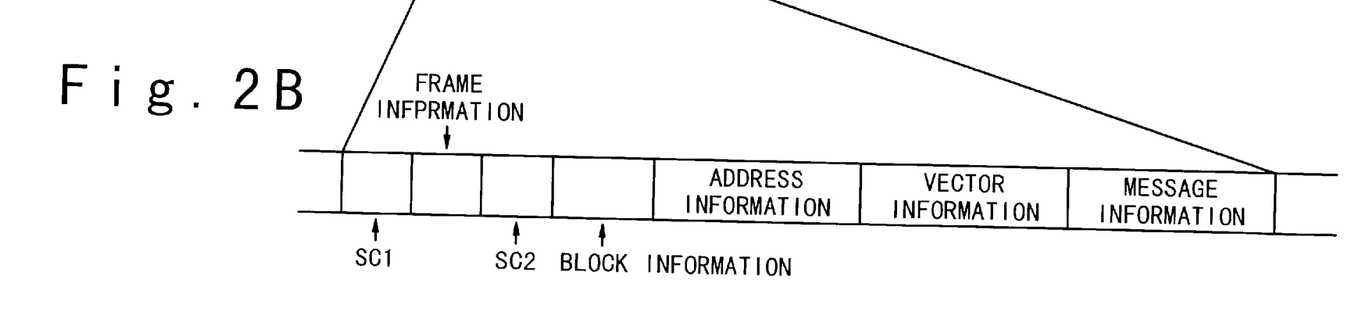

FIG. 2A and 2B show the communication formats which are used for the wireless selective call receiver. A set of 128 frames is repeatedly transmitted from the base station. Each frame is composed of the field SC1 in which sync signal 1 is stored, the frame information field in which a frame number and so on are stored, the field SC2 in which sync signal 2 is stored, the block information field in which the lengths of address information, vector information, and message information which have variable lengths are stored, the address information field in which an destination address is stored, the vector information field in which shows a kind of the message signal, and the message information field which a message signal is stored.

Figure 6:
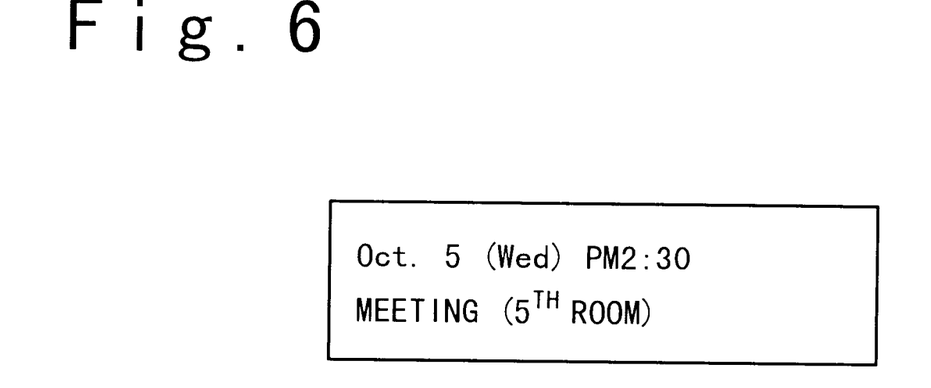
FIG. 6 is a diagram illustrating a display example of an alarm message signal.
Figure 7:
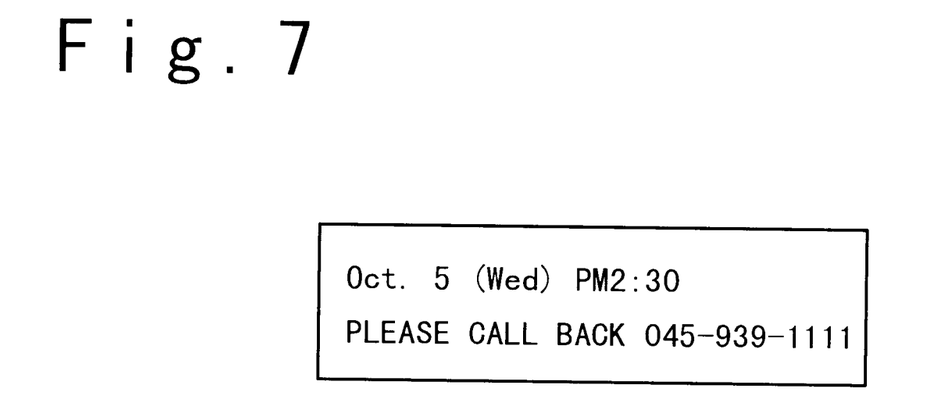
FIG. 7 is a diagram illustrating a display example of a reception message.

The receiver monitors data in the address information field and receives only the frames destined to the wireless selective call receiver. There are a case where the received message signal is a normal message signal and a case where the received message signal is an alarm message signal. An example of the normal message signal is shown in FIG. 7. Also, an example of the alarm message signal is shown in FIG. 6.

Whether the received message signal is a normal message signal or an alarm message signal is determined based on the format of the message. For example, the alarm message signal has a signal structure like "[VV-WW-XX-YY] Z . . . ". The content in the symbol [ ] is an alarm time information which is used to set the alarm time in the wireless selective call receiver. That is, the signal portion VV indicates a month and takes a value in a range of 01 to 12. The signal portion WW indicates a day and takes a value in a range of 01 to 31. The signal portion XX indicates a time and takes a value in a range of 00 to 24. The signal portion YY indicates a minute and takes a value in a range of 00 to 60. Also, the signal portion Z . . . is an additional message signal which is attached to the alarm information, e.g., is composed of 11 characters in maximum. In this case, an alarm message signal is stored in the form of predetermined alarm information which is applied to the alarm information which is manually inputted in the storage section 107 to be mentioned later.

Figure 3:
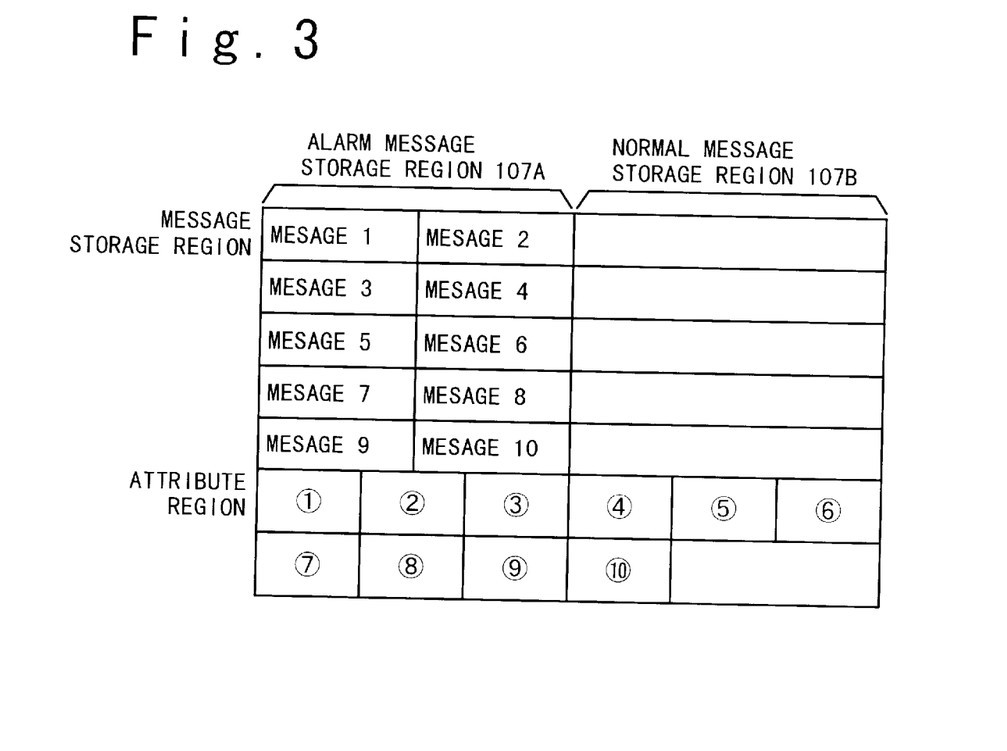
FIG. 3 is a diagram illustrating the message storage region map of a message storage section.

The message signals (normal message and the alarm message signal) are stored in the storage section 107 in accordance with the storage region map which is shown in FIG. 3. The storage section 107 is composed of an alarm message storage region 107A, a normal message storage region 107B and an attribute region. The attribute region is allocated for each of the storage areas of alarm message storage region 107A.

A plurality of attributes such as a protection attribute and an informed state attribute can be added to one alarm message signal. Each of these attributes is designated with one bit of a byte data in the attribute region. A protection/non-protection attribute, an informed/un-informed state attribute and so on are provided for the alarm message signal as the attribute. The designation of the protection/non-protection attribute is performed by operation of the switch section 106 by the user. When entering the attribute designation operation of the message signal through the operation of the switch section 106, the control section 105 gives the protection/nonprotection attribute to each of the message signals in the storage section 107, as mentioned later. Thus, the user of the receiver can distinguish the importance of the message signal during a message confirmation operation. The protection attribute is given to the important message signal. As a result, it is possible to set in such a manner that it is not deleted from storage section 107. Note that the informed/un-informed state attribute is automatically given by the control section 105 after the informing operation.

The control section 105 determines whether or not the received message signal is in an alarm message form, to distinguish that the received message signal is an alarm message signal or a normal message signal, after the above-mentioned call informing operation. When the received message signal is the normal message signal, the control section 105 stores the received message signal in the normal message storage region 107B. When the alarm message signal is received, the control section 105 refers to the storage region 107 to check the number of alarm message signals which are stored in the alarm message storage region 107A of the storage section 107. When the alarm message storage region 107B is full, the control section 105 checks the attribute of each of the alarm message signals stored in the alarm message storage region 107B. When there is any alarm message signal having the informed state attribute and the non-protection attribute in the alarm message storage region 107A, the control section 105 deletes the alarm message signal from the alarm message storage region 107A. Then, the control section 105 stores the received alarm message signal in the empty storage area formed by deleting the alarm message signal having the informed state attribute and the non-protection attribute.

Also, when the message content of the above message signal is to be confirmed after the above-mentioned call informing operation, the user operates the switch section 106 to makes the control section 105 to perform the message confirmation operation. When entering the message confirmation operation, the control section 105 sequentially reads the message signals which are stored in storage section 107, and drives the liquid crystal display driver 108 to displays the above message signals on the liquid crystal display 109.

Further, when the control section 105 refers to the attribute region and detects that the time reaches an alarm time of one of the alarm message signals which are stored in the alarm message storage region 107A, the control section 105 informs an alarm with speech by the speaker 111A and/or displays the addition message on the liquid crystal display 109.

As described above, in the wireless selective call receiver in the embodiment, because the protection attribute can be given to the alarm message signal which has been stored in the storage section 107 by the operation of the switch section 106, there is no case where an important alarm message signal is deleted against the will of the user and it is replaced by a new alarm message signal, even if the new alarm message signal is received in the state in which an alarm message signal is fully stored in the alarm message storage region 107A.

Figure 4:
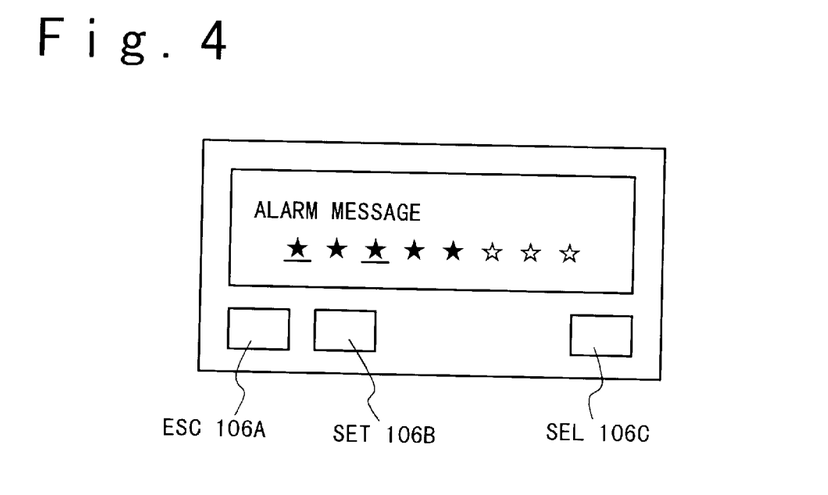
FIG. 4 is a diagram illustrating the structure example of a switch section.
Figure 5:
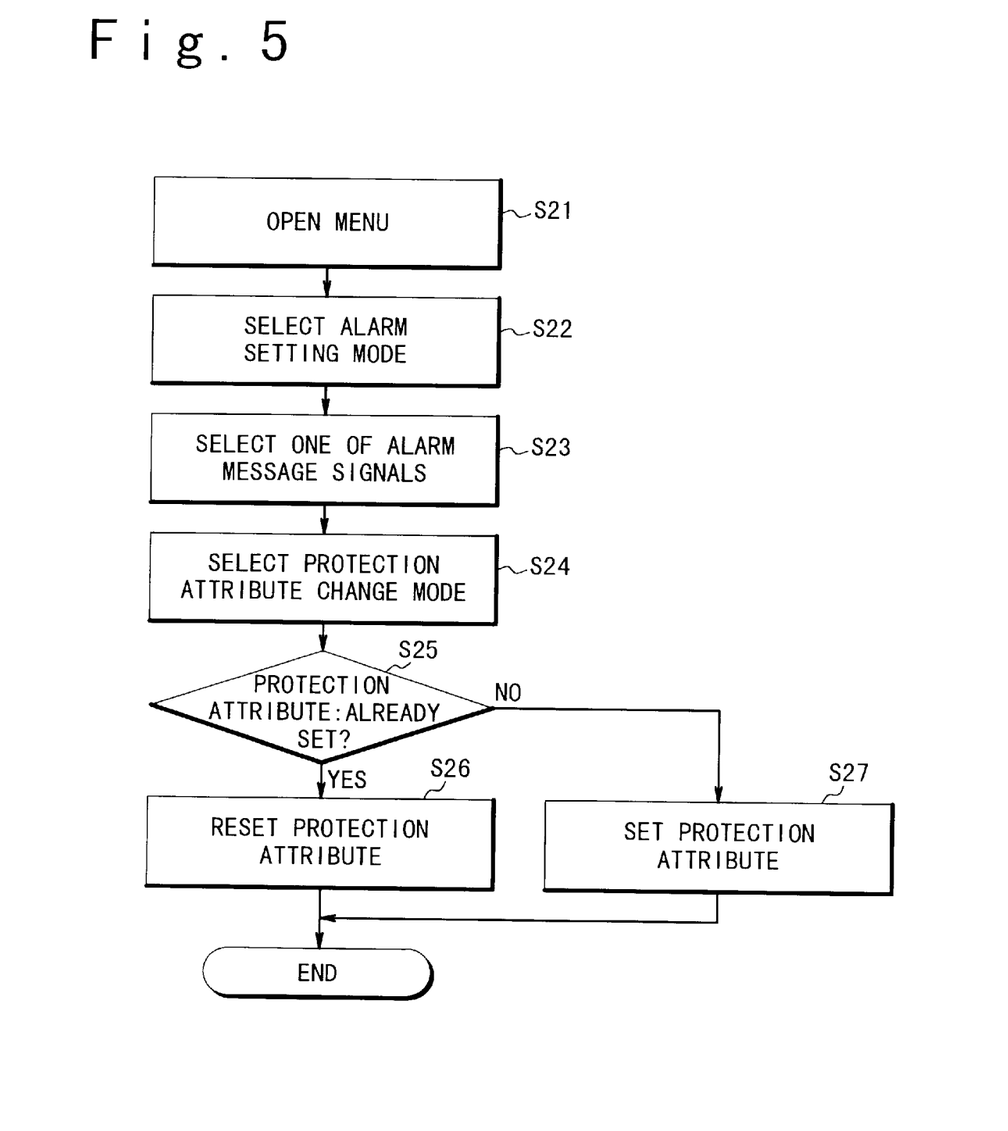
FIG. 5 is a flow chart to explain the operation when the attribute of an alarm message signal is changed.

Next, the attribute setting processing will be described in detail with reference to FIGS. 4 and 5. An example of the structure of the switch section 106 is shown in FIG. 4. The switch section 106 is composed of an ESC switch 106A, a SET switch 106B and a SEL switch 106C. A menu screen is displayed when the ESC switch 106A is operated in a step S21. In a step S22, an alarm icon is selected from the menu screen using the SEL switch 106C and the SET switch 106B is operated to set an alarm setting mode. At this time, the display of the liquid crystal display 109 is as shown in FIG. 4. In this case, a symbol "★" indicates the area where an alarm message signal is stored in the alarm message storage region 107A, a symbol "☆" indicates the area where an alarm message signal is not stored in the alarm message storage region 107A and a symbol "_" indicates that a protection attribute is already set.

In a step S23, the SEL switch 106C is operated to select one of the alarm message signals whose attribute should be changed. After that, the SET switch 106B is operated. In a step S24, the SEL switch 106C is operated to one of the kinds of the attribute which should be changed. After that, the SET switch 106B is operated. Thus, the protection attribute is selected.

The determination of whether or not the protection attribute is already set to the selected alarm message signal is performed in a step S25. When the protection attribute is determined not to be set, a step S27 is executed. In the step S27, the SEL switch 106C is operated, "setting" is selected and then the SET switch 106B is operated. In this manner, the symbol "_" is added under the symbol of the selected alarm message signal. In this manner, the protection attribute is set to the alarm message signal. On the other hand, when the protection attribute is determined to be already set, in the step S25, a step S26 is executed. In the step S26, the SEL switch 106C is operated, "cancellation" is selected and then the SET switch 106B is operated. Thus, the symbol "_" under the symbol of the selected alarm message signal is deleted. At the same time, the protection attribute which was set for the alarm message signal is also canceled or reset.

Figure 8:
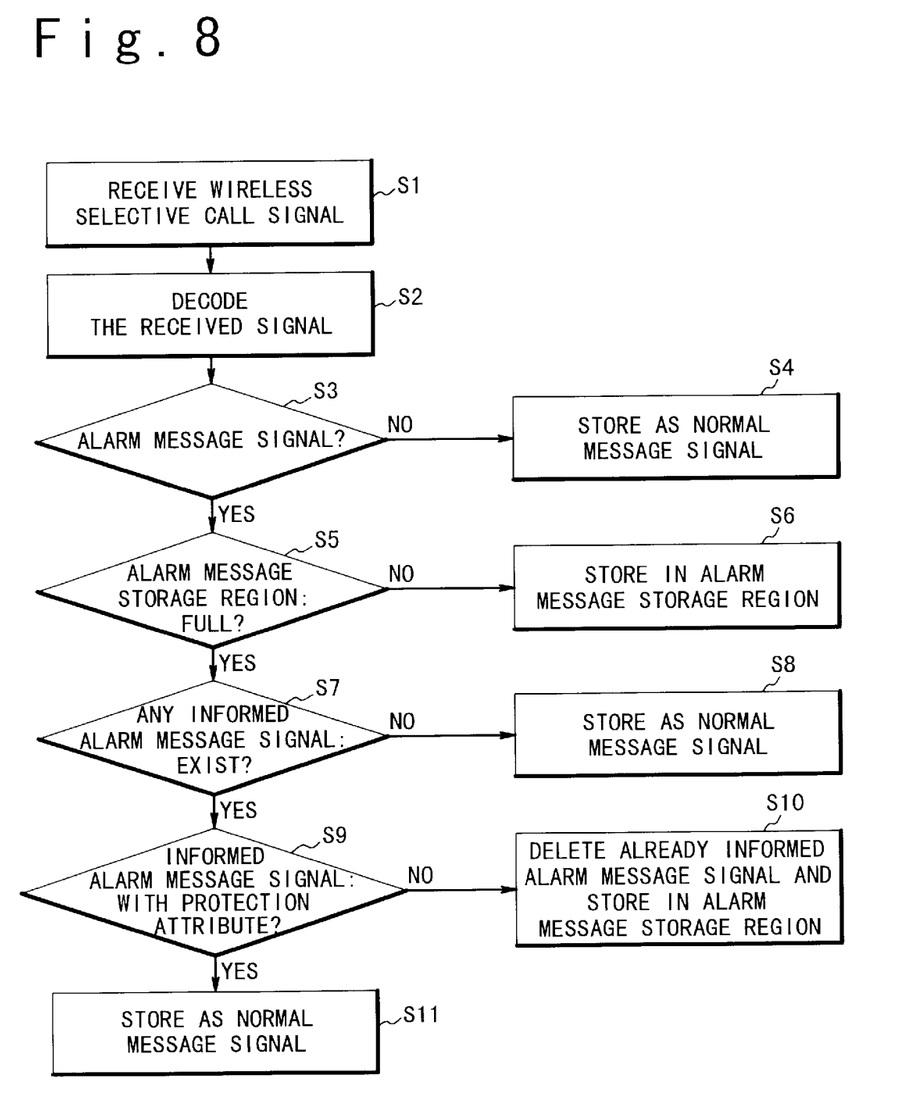
FIG. 8 is a flow chart to explain alarm message processing in the wireless selective call receiver of the present invention.

Next, the operation when the wireless selective call receiver receives an alarm message will be described. FIG. 8 is a flow chart illustrating the reception processing of the alarm message in the wireless selective call receiver shown in FIG. 1.

The wireless selective call signal is received by the antenna 101 and the wireless section 102 (step S1). In the decoder section 103, the received selective call signal is decoded to produce a message signal and sent to the control section 105 (step S2). The control section 105 distinguishes whether or not the received message signal is in an alarm message form (step S3). When the received message is not in the alarm message form (N of step S3), the control section 105 stores the received message signal in the normal message storage region 107B of the storage section 107 as the normal message signal (step S4). On the other hand, if the received message signal is in the alarm message form (Y of step S3), the control section 105 checks the number of the alarm message signals which are already stored in the alarm message storage region 107A in storage section 107 (step S5). If a storage region is left (N of step S5) in the alarm message storage region 107A, the control section 105 stores a received alarm message signal in the alarm message storage region 107A (step S6).

On the other hand, when alarm message signals is fully stored in the storage capacity of the alarm message storage region 107A (Y of step S5), the control section 105 refers to the attribute region in the storage section 107 to check whether or not there is an alarm message signal having the informed state attribute in the alarm message storage region 107A (step S7). When all the alarm message signals stored in the alarm message storage region 107A have the un-informed state attribute, the control section 105 stores the newly received alarm message signals in the normal message storage region 107B as the normal message signal (step S8). On the other hand, when there is any alarm message signal have the informed state attribute in the alarm message storage region 107A, the control section 105 refers to the attribute region of the storage section 107 to check whether or not the alarm message signal having the informed state attribute has the protection attribute (step S9). When the alarm message signal having the informed state attribute has the non-protection attribute, the control section 105 deletes the alarm message signal having the informed state attribute from the alarm message storage region 107A and stores the received alarm message signal in the alarm message storage region 107A (step S10). On the other hand, when the protection attribute is given to the alarm message signal having the informed state attribute (Y of step 9), the control section 105 stores the received alarm message signal in the normal message storage region 107B as the normal message signal.

As described above, according to the present invention, the alarm message signal can be allocated with the protection attribute such that the alarm message signal is not deleted from the alarm message storage region. Therefore, even if an alarm message signal is newly received when alarm message signals are fully stored in the alarm message storage region of the storage section, there is no case that an important alarm message signal is deleted against the will of the user and is replaced by the new alarm message signal.

What is claimed is:

1. A wireless selective call receiver comprising:

receiving means for receiving a wireless selective call signal including a selective call signal and subsequent a message signal and destined to said wireless selective call receiver and for decoding the received wireless selective call signal;

storage means having an alarm message storage region for storing alarm message signals and a normal message storage region for storing normal message signals;

informing means for informing an alarm at an alarm time set in each of said alarm message signals which are stored in said alarm message storage region;

detecting means for detecting whether the received message signal is a new alarm message signal or a new normal message signal; and write means for writing said new normal message signal in said normal message storage region when the received message signal is said normal message signal, and for selectively storing said new alarm message signal in said alarm message storage region or said normal message storage region based on a number of said alarm message signals stored in said alarm message storage region and a protection attribute of each of said alarm message signals, wherein said protection attribute protects a corresponding alarm message signal from a delete operation.

2. A wireless selective call receiver according to claim 1, wherein said storage means includes an attribute region for storing said protection attribute for each of said alarm message signals, and wherein said write means refers to said attribute region to write said new normal message signal in said storage means.

3. A wireless selective call receiver according to claim 1, further comprising allocating means for allocating said protection attribute to said alarm message signals in said alarm message storage region including said new alarm message signal.

4. A wireless selective call receiver according to claim 3, wherein said allocating means includes:

mode setting means for setting an attribute change mode;

selecting means for selecting one of said alarm message signals in said alarm message storage region including said new alarm message signal; and setting means for setting said protection attribute for said selected alarm message signal.

5. A wireless selective call receiver according to claim 3, further comprising canceling means for canceling said protection attribute from said alarm message signals in said alarm message storage region including said new alarm message signal.

6. A wireless selective call receiver according to claim 5, wherein said canceling means includes:

mode setting means for setting an attribute change mode;

selecting means for selecting one of said alarm message signals in said alarm message storage region including said new alarm message signal; and resetting means for resetting said protection attribute for said selected alarm message signal.

7. A wireless selective call receiver according to claim 1, wherein said write means includes means for writing said new alarm message in said alarm message storage region when there is a free area in said alarm message storage region, for writing said new alarm message in said alarm message storage region in place of a specific one of said alarm message signals when said alarm message storage region is full and when the specific alarm message signal has been already informed and is not allocated with said protection attribute, and for writing said new alarm message in said normal message storage region when said alarm message storage region is full and when all said alarm message signals are allocated with said protection attribute.

8. A method of storing a new alarm message signal in a wireless selective call receiver, comprising the steps of:

receiving a wireless selective call signal including a selective call signal and subsequent a message signal and destined to said wireless selective call receiver and decoding the received wireless selective call signal;

detecting whether the received message signal is a new alarm message signal or a new normal message signal; and performing a first writing operation of said new alarm message in said alarm message storage region when there is a free area in an alarm message storage region;

performing a second writing operation of said new alarm message in said alarm message storage region in place of a specific one of said alarm message signals when said alarm message storage region is full and when the specific alarm message signal has been already informed and is not allocated with a protection attribute;

performing a third writing operation of said new alarm message in said normal message storage region when said alarm message storage region is full and when all said alarm message signals are allocated with said protection attribute.

9. A method according to claim 8, further comprising the steps of:

informing an alarm at an alarm time set in each of said alarm message signals which are stored in said alarm message storage region; and allocating an information attribute to each of said alarm message signals when the alarm is informed at the alarm time set in each of said alarm message signals.

10. A method according to claim 8, further comprising the step of allocating said protection attribute to said alarm message signals in said alarm message storage region including said new alarm message signal.

11. A method according to claim 10, wherein said allocating step includes:

setting an attribute change mode;

selecting one of said alarm message signals in said alarm message storage region including said new alarm message signal; and setting said protection attribute for said selected alarm message signal.

12. A method according to claim 8, further comprising the step of canceling said protection attribute from said alarm message signals in said alarm message storage region including said new alarm message signal.

13. A method according to claim 12, wherein said canceling step includes:

setting an attribute change mode;

selecting one of said alarm message signals in said alarm message storage region including said new alarm message signal; and resetting said protection attribute for said selected alarm message signal.

14. A wireless selective call receiver, comprising:

receiving means for receiving a wireless selective call signal including a selective call signal and subsequent a message signal and destined to said wireless selective call receiver and decoding the received wireless selective call signal;

detecting means for detecting whether the received message signal is a new alarm message signal or a new normal message signal; and write means for performing a first writing operation of said new alarm message in said alarm message storage region when there is a free area in an alarm message storage region, performing a second writing operation of said new alarm message in said alarm message storage region in place of a specific one of said alarm message signals when said alarm message storage region is full and when the specific alarm message signal has been already informed and is not allocated with a protection attribute, and performing a third writing operation of said new alarm message in said normal message storage region when said alarm message storage region is full and when all said alarm message signals are allocated with said protection attribute.

15. A wireless selective call receiver according to claim 14, further comprising:

informing means for informing an alarm at an alarm time set in each of said alarm message signals which are stored in said alarm message storage region; and allocating means for allocating an information attribute to each of said alarm message signals when the alarm is informed at the alarm time set in each of said alarm message signals.

16. A wireless selective call receiver according to claim 14, further comprising allocating means for allocating said protection attribute to said alarm message signals in said alarm message storage region including said new alarm message signal.

17. A wireless selective call receiver according to claim 16, wherein said allocating means includes:

mode setting means for setting an attribute change mode;

selecting means for selecting one of said alarm message signals in said alarm message storage region including said new alarm message signal; and protection setting means for setting said protection attribute for said selected alarm message signal.

18. A wireless selective call receiver according to claim 14, further comprising canceling means for canceling said protection attribute from said alarm message signals in said alarm message storage region including said new alarm message signal.

19. A wireless selective call receiver according to claim 18, wherein said canceling means includes:

mode setting means for setting an attribute change mode;

selecting means for selecting one of said alarm message signals in said alarm message storage region including said new alarm message signal; and resetting means for resetting said protection attribute for said selected alarm message signal.

\* \* \* \* \*